United States Patent Office 3,220,504
Patented Nov. 30, 1965.

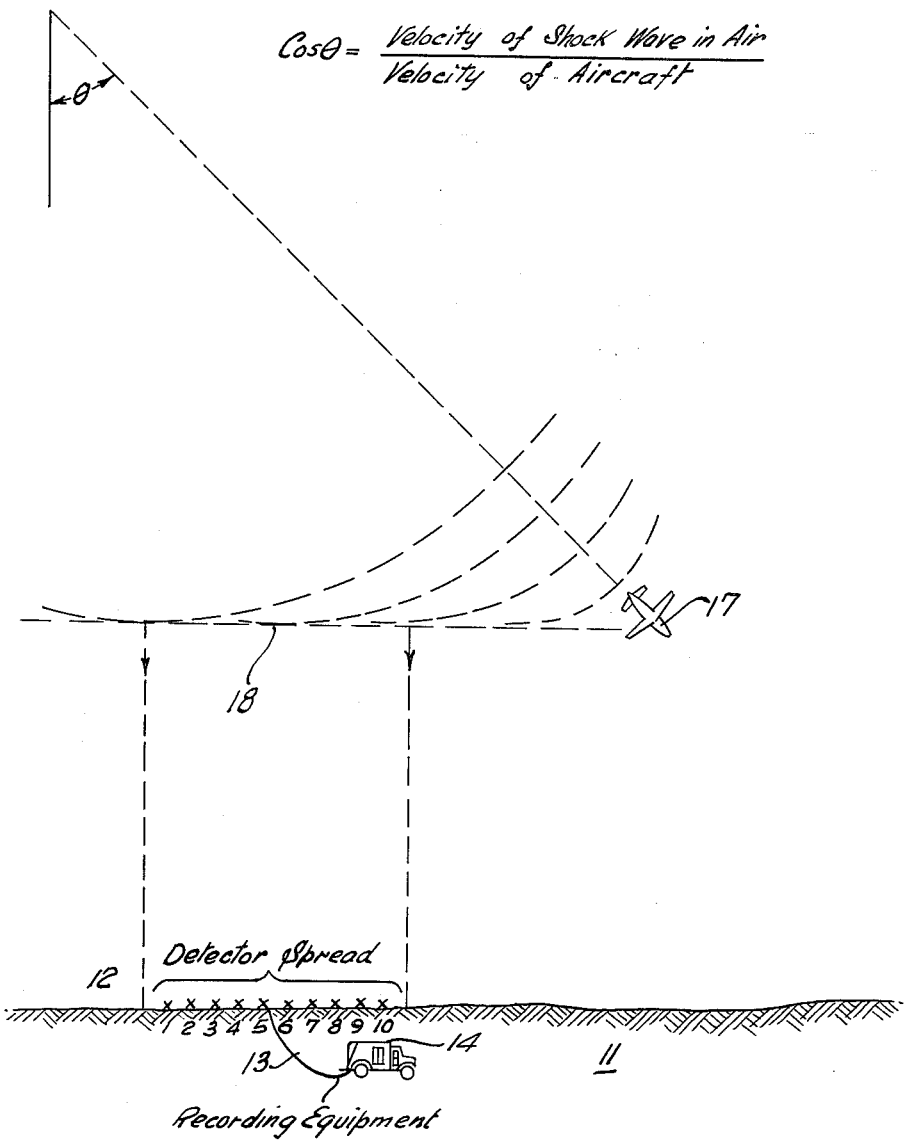

3,220,504
SEISMIC SHOCK WAVE EXPLORATION METHOD
Alvin L. Parrack, Bellaire, Tex., assignor to Texaco Inc., New York, N.Y., a corporation of Delaware
Filed Feb. 13, 1962, Ser. No. 172,982
3 Claims. (Cl. 181—.5)

This invention is concerned with seismic exploration in general and more specifically relates to a method that is especialy adaptable for use in reflection type seismic work.

Heretofore in connection with seismic exploration work, the generation of seismic waves has created difficulties by reason of the relatively high proportion of undesired waves that are generated at the same time as the desired vertically traveling pressure waves. Various techniques have been suggested and employed for reducing the undesired wave components, and while the use of explosives for generating the seismic wave energy has been found in general the most satisfactory, there have been various atempts to improve the quality of the energy generated in order to reduce the unwanted energies and provide more accurate and readily interpreted records as a result. Among the suggestions heretofore made for improving the character of the generated seismic wave energy, has been the use of explosives detonated above the surface of the earth (in various patterns or arrays) in an attempt to create a shock wave that will enter the earth with a minimum of generation of undesired wave energies. However, such attempts have had various drawbacks and have turned out to be quite unsatisfactory.

Consequently it is an object of this invention to teach a method of seismic operation which involves a novel and greatly improved procedure for generating seismic wave energy directed downward into the earth's surface, with the generation of a minimum of undesired wave energies. This method includes a procedure such that the generated wave energy is in the form of a plane wave-front that extends over a very substantial area so that it penetrates into the earth with a minimum of unwanted wave energy generation.

Another object of the invention is to provide a method for generating a plane wave-front, traveling at a predetermined angle downward toward the surface of the earth. This is accomplished by means of employing a high speed object traveling downward toward the earth at a predetermined angle relative to the vertical (or a desired perpendicular from an angled subsurface stratum) and then making use of this energy in recording the seismic data in connection therewith, e.g. to determine reflections from subsurface strata.

Briefly, the invention is concerned with seismic exploration and deals with a method of reducing undesirable seismic energy in the generation of a downgoing compression wave that is to be employed for recording reflections therefrom from subsurface strata. The method comprises the steps of generating a plane wave-front that extends over a substantial area of the earth's surface, said plane wave-front making a predetermined angle with the vertical from said area of the earth's surface. In addition the method comprises the step of recording seismic wave energy at a plurality of spaced locations adjacent to the surface of the earth in the vicinity of said area during a period of time including the arrival of said plane wave-front at the surface of the earth and continuing sufficient time thereafter in order to record desired reflections from said subsurface strata.

Again briefly, the invention is concerned with a method that is applicable to seismic exploration and particularly with reflection type as indicated above, but wherein the method comprises among others the step of causing a high speed object to travel downward toward the earth at an angle with the vertical the cosine of which equals the ratio of the velocity of the shock wave created in air to the velocity of the object, in order to create a horizontal plane wave-front extending over a substantial area of the earth's surface.

The foregoing and other objects and benefits of the invention will be made clearer in connection with a specific illustration of an embodiment of the invention that is set forth below in greater detail, and that is illustrated in the drawing, in which:

The figure of drawing illustrates schematically the use of an aircraft in generating a plane wave-front to be used in making a seismic record in accordance with the invention.

Referring to the figure of drawing, it will be observed that there is illustrated a given portion of the earth's surface 11 upon which there is laid out a so-called spread that includes a plurality of seismic detectors 12 which are laid out in a predetermined pattern on or near the surface of the earth, and which have electrical circuit connection via a cable 13 into a recording truck 14 where the usual seismic recording equipment is located.

Above the area on the earth's surface where the detector spread is located, there is shown a high speed aircraft 17 that is diving toward the earth's surface at an angle theta which will be predetermined in order to create a broad area plane wave-front 18 that is indicated by a dashed line. In order to make the wave-front 18 substantially horizontal, the angle must be such that the cosine of theta equals the velocity of the shock wave in air divided by the velocity of the aircraft. It will be readily noted from the foregoing that should the plane of wave-front 18 be desirably at some angle other than horizontal, it is only necessary that the angle of dive of the aircraft 17 and/or the velocity thereof should be adjusted accordingly.

In carrying out a method according to this invention the steps which must of necessity be completed include the following. First, the step of generating a plane wave-front that extends over a substantial area of the earth's surface must be carried out. It is contemplated that this step should most preferably be done by means of a high speed object traveling through the air at a predetermined angle downward toward the earth's surface. Such object must, of course, be traveling at a speed greater than the speed of sound in order to generate a shock wave as it travels through the air. Then by regulating the path of travel of such object, the shock wave as it is continuously generated will form an essentially plane wave-front having a predetermined angle as above indicated.

It will be appreciated that the wave-front 18 is actually in the form of a cone rather than a plane. However, by considering primarily the tangent line of the cone's surface formed by a plane that is perpendicular to a given reference axis, e.g. the vertical, the effective portion of the wave-front may be considered to be a plane. But, consequently when the spread of detectors 12 is made along a given line, the orientation or compass direction of the dive path of the craft 17 should coincide or be parallel thereto.

In reflection seismic work it is preferable to have the wave-front that is to be reflected lying substantially parallel to the reflecting stratum. Consequently if the dip of a stratum of interest is known it would be helpful to generate the wave-front 18 at an angle other than horizontal but related to a perpendicular from the stratum. This would be accomplished by regulating the dive angle of the craft 17, or by regulating the speed of the craft or both, and in relation to the speed of the shock wave in air under the atmospheric conditions then existing.

While it is conceivable that the high speed object could be a missile or similar type of object, it is preferable that it should be a manned aircraft in order that the action taken in creating the desired wave-front may be repeated or varied in accordance with instructions from the ground, so as to coordinate this wave-front generation with the recording of the seismic reflection energy created therefrom.

A second step of the invention is that of recording the seismic wave energy in the earth's surface by providing a spread of seismic detectors along the surface of the earth, and by making a recording of the seismic energies as transformed into electrical signals at the time that the pressure wave enters the earth's surface and for a sufficient time thereafter to allow reflections of the downward traveling seismic energies to return from subsurface strata.

It will be noted that in carrying out the recording step of this invention, any conventional equipment may be employed. It is contemplated that the operator of the recording equipment need merely be prepared so that he is able to operate the equipment commencing a short while before the wave-front 18 arrives at the surface of the earth, and then continue to record until there would not be expected to be any further reflections received from subsurface strata.

It is to be noted that as indicated above it may be preferable for the wave-front 18 to have some angle other than horizontal so that it may travel downward into the earth's surface and approach a subsurface stratum substantially along a perpendicular thereto. In other words, whereas in much of the exploration work that would be carried out employing this invention it would be done using an angle theta for the aircraft dive adjusted to create the wave-front 18 traveling downward in a direction perpendicular to the vertical at that location above the earth, where it is known that a reflecting bed or subsurface stratum of interest lies at some angle other than the horizontal, the angle of dive and speed of the aircraft should be adjusted so as to create the wave-front 18 lying at an angle that is perpendicular to a perpendicular from the subsurface stratum of interest.

While a particular embodiment of the invention has been described in considerable detail above in accordance with the applicable statutes, this is not to be taken as in any way limiting the invention but merely as being descriptive thereof.

I claim:

1. In seismic exploration, a method of generating a downgoing compression wave in the earth having reduced undesirable wave energy for reflection from subsurface strata comprising the steps of causing an aircraft to travel downward toward the earth at supersonic speeds and at an angle with the perpendicular from a predetermined subsurface stratum the cosine of which equals the ratio of the velocity of the shock wave created in air to the velocity of the aircraft, in order to create a plane wave-front parallel to said subsurface stratum and extending over a substantial area of the earth's surface, recording seismic wave energy at a plurality of spaced locations adjacent to the surface of the earth in the vicinity of said area during a period of time including the arrival of said plane wave-front at the surface of the earth and sufficient time thereafter to record desired reflections from said subsurface strata.

2. The invention according to claim 1 wherein said aircraft is manned.

3. In seismic exploration, a method of generating a downgoing compression wave in the earth having reduced undesirable wave energy for reflection from subsurface strata comprising the steps of causing an aircraft to travel downward toward the earth at supersonic speeds and at an angle with the vertical the cosine of which equals the ratio of the velocity of the shock wave created in air to the velocity of the aircraft, in order to create a plane wave-front extending over a substantial area of the earth's surface, recording seismic wave energy at a plurality of spaced locations adjacent to the surface of the earth in the vicinity of said area during a period of time including the arrival of said plane wave-front at the surface of the earth and sufficient time thereafter to record desired reflections from said subsurface strata.

References Cited by the Examiner

UNITED STATES PATENTS 2,656,003    10/1953    Poulter _____ 181—.5

OTHER REFERENCES

Engineering News-Record, vol. 164, No. 6, page 17, Feb. 11, 1960.

SAMUEL FEINBERG, *Primary Examiner.*

CHESTER L. JUSTUS, *Examiner.*